US012222826B2

(12) United States Patent
Tummala et al.

(10) Patent No.: US 12,222,826 B2
(45) Date of Patent: Feb. 11, 2025

(54) TRAFFIC ISOLATION AT A CHIP-TO-CHIP GATEWAY OF A DATA PROCESSING SYSTEM

(71) Applicant: Arm Limited, Cambridge (GB)

(72) Inventors: Ashok Kumar Tummala, Cedar Park, TX (US); FNU Parshant, Leander, TX (US); Rishabh Jain, Austin, TX (US); Apurva Patel, Austin, TX (US); Surabhi Garg, Austin, TX (US); Sai Kumar Marri, Austin, TX (US)

(73) Assignee: Arm Limited, Cambridge (GB)

( * ) Notice: Subject to any disclaimer, the term of this patent is extended or adjusted under 35 U.S.C. 154(b) by 101 days.

(21) Appl. No.: 18/104,458

(22) Filed: Feb. 1, 2023

(65) Prior Publication Data
US 2024/0256406 A1 Aug. 1, 2024

(51) Int. Cl.
G06F 11/07 (2006.01)
G06F 11/20 (2006.01)

(52) U.S. Cl.
CPC .......... G06F 11/2007 (2013.01); G06F 11/07 (2013.01); G06F 11/203 (2013.01); G06F 2201/805 (2013.01)

(58) Field of Classification Search
CPC .. G06F 11/2007; G06F 11/07; G06F 11/3027; G06F 11/30; G06F 11/349; G06F 2201/805
See application file for complete search history.

(56) References Cited

U.S. PATENT DOCUMENTS

| 6,865,157 | B1* | 3/2005 | Scott | H04L 41/00 370/242 |
| 9,990,292 | B2 | 6/2018 | Jalal et al. | |
| 10,310,979 | B2 | 6/2019 | Jalal et al. | |
| 2006/0063501 | A1* | 3/2006 | Adkisson | G06F 12/0813 455/230 |
| 2008/0178278 | A1* | 7/2008 | Grinstein | H04L 63/0227 726/12 |
| 2012/0059957 | A1* | 3/2012 | Millsaps | H04L 49/35 710/316 |
| 2013/0151888 | A1* | 6/2013 | Bhattiprolu | G06F 11/2007 714/E11.062 |

(Continued)

FOREIGN PATENT DOCUMENTS

EP 3580662 B1 4/2021

*Primary Examiner* — Yolanda L Wilson
(74) *Attorney, Agent, or Firm* — Leveque Intellectual Property Law, P.C.

(57) ABSTRACT

A mechanism for error containment in a data processing system includes receiving a transaction request at a gateway between a host and a device, allocating an entry for the request in a local request tracker of the gateway and sending a link request, to a port of the gateway. In response to an isolation trigger, the port is moved into isolation by completing in-process requests with entries in the tracker and locking the entries. On receiving a response to an in-process request while the port is in isolation, the response is dropped, the associated entry is unlocked, and allocation of the entry is enabled. A completion response is sent to the requester without dispatching a new link request to the port. When requests are completed, the system is quiesced, locked entries are unlocked, and the port is moved out of isolation.

20 Claims, 6 Drawing Sheets

(56) References Cited

U.S. PATENT DOCUMENTS

2015/0220409 A1\* 8/2015 Shao .................. G06F 11/0745
714/4.5
2017/0185516 A1 6/2017 Stevens et al.

\* cited by examiner

TRAFFIC ISOLATION AT A CHIP-TO-CHIP GATEWAY OF A DATA PROCESSING SYSTEM

BACKGROUND

A data processing system may include multiple integrated circuits or chips. A chip-to-chip gateway provides a communication link that enables messages to be passed between chips. A transaction between chips may involve an exchange of messages, such as requests and responses, and may fail for various reasons. It is desirable that any failure between a host chip and device chip be handled gracefully, with minimum impact on the performance of the host.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
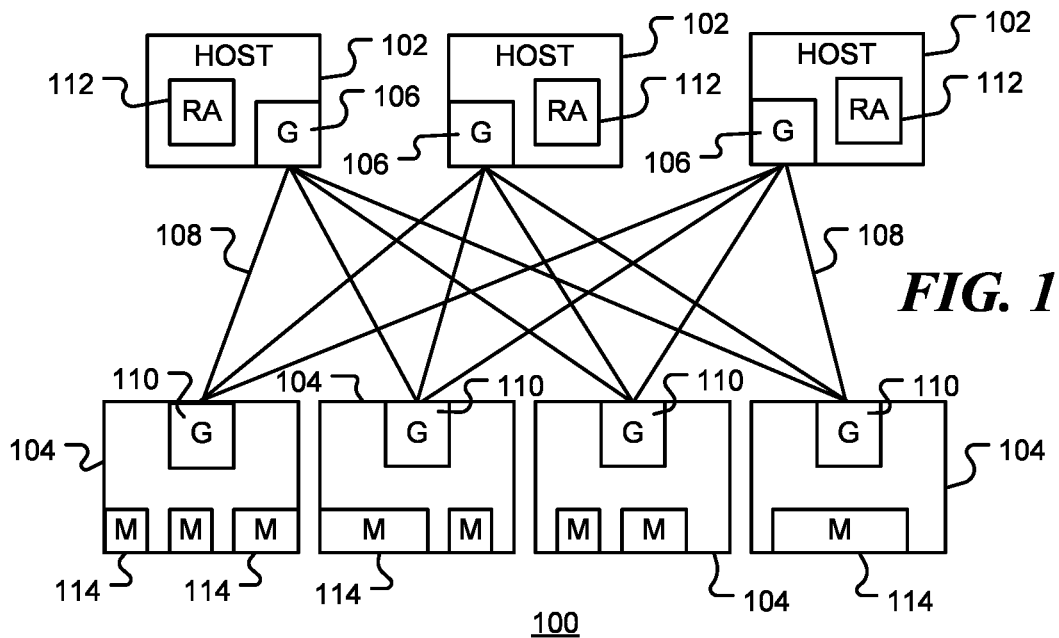
FIG. 1 is a block diagram of a data processing system, in accordance with various representative embodiments.

The various apparatus and devices described herein provide mechanisms for handling failures in chip-to-chip communication.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

In accordance with various embodiments of the disclosure, a mechanism is provided for error containment in a data processing system. The mechanism includes receiving a transaction request at a gateway between a host chip and a device chip, allocating an entry for the request in a local request tracker of the gateway and sending a link request to a port of the gateway. The local request tracker is a mechanism for monitoring transaction requests and may include a table for storing request identifiers and associated data such as transaction status. The link request is based on the transaction request. In response to an isolation trigger, the port is moved into isolation by completing all in-process requests with entries in the local request tracker and locking the entries. On receiving a response to an in-process request, while the port is in isolation, the response is dropped, the associated entry is unlocked, and allocation of the entry is enabled. A completion response is sent to the requester without dispatching a new link request to the port. When all requests are completed, the system is quiesced (by pausing the system or putting the system in a consistent state), all locked entries are unlocked, and the port is moved out of isolation. The port may be a root port, a downstream port of a hierarchy of ports, a device port, or an upstream port of a hierarchy of ports.

The trigger may be a transaction timeout or link failure, for example. A timeout counter of the gateway may be configured based, at least in part, on a value read from a programmable platform register, the value indicating a number of clock cycles in a designated time interval. Configuring the timeout counter includes setting an initial or final value of the timeout counter. Configuration may also include setting configuration values for a plurality of designated timeout ranges and storing the configuration values in a look-up table to be accessed during operation. Further, configuration may include setting a timeout counter width for each designated timeout range.

An entry in the local request tracker may be reserved for new incoming requests received when the gateway is in isolation mode. The entry is used only when no link request will be sent out for the new incoming request, there are no free entries in the local request tracker, and the entries within the local request tracker have timed out or have sent out a link request.

FIG. 1 is a simplified block diagram of a data processing system 100, in accordance with embodiments of the present disclosure. Data processing system 100 includes multiple integrated circuits (ICs) or chips, such as host ICs 102 and device ICs 104. A chip-to-chip gateway 106 of a host IC 102 provides access to one or more communication links 108 to corresponding chip-to-chip gateways 110 on device IC 104. The links enable messages to be passed between the host ICs and device ICs. The links may include a hierarchy of switches to enable a host IC to communicate with two or more device ICs or to enable two or more host ICs to communicate with the same device IC.

An example link is Compute Express Link™ (CXL™) of the Compute Express Link Consortium, Inc. CXL™ provides a coherent interface for ultra-high-speed transfers between a host and a device, including transaction and link layer protocols together with logical and analog physical layer specifications.

Hosts 102 include one or more requesting agents 112, such as a central processing unit (CPU) or CPU cluster. Devices 104 may include, or be directly coupled to, one or more memories 114. The memories may have difference sizes and may be volatile, non-volatile, or persistent, for example.

Transaction between chips may involve an exchange of messages, such as requests and responses, and may fail for various reasons. It is desirable that any failure between a host chip and device chip be handled gracefully, with minimum impact on the performance of the host.

Figure 2:
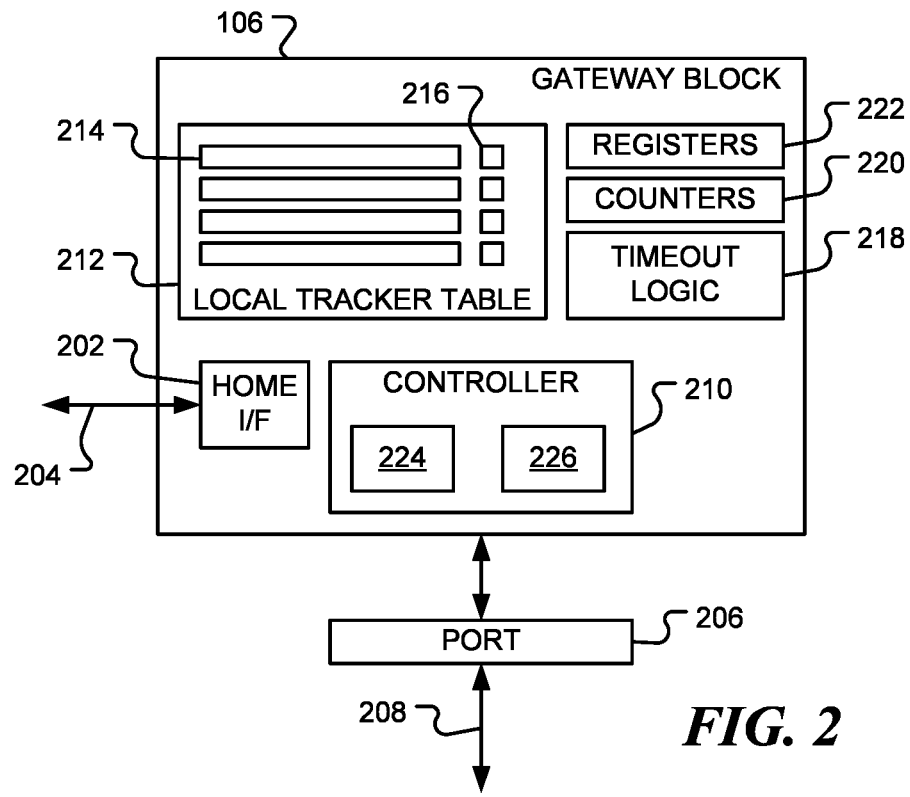
FIG. 2 is a simplified block diagram of a chip-to-chip gateway of a data processing system, in accordance with various representative embodiments.

FIG. 2 is a simplified block diagram of a chip-to-chip gateway 106, in accordance with various representative embodiments. Gateway 106 includes home interface (host I/F) 202. On a host chip, home interface 202 provides a connection 204 to a local requesting agent, such as a central processing unit (CPU) or CPU cluster. On a device chip, home interface provides a connection to local agents. Gateway 106 is coupled to port 206 that provides a link 208 to one or more devices. Link 208 may include a hierarchy of downstream ports. Operation of gateway 106 is managed by controller 210 that includes transaction management circuitry 224 and dispatch logic circuitry 226, for example.

Gateway 106 may be specified as an Intellectual Property (IP) block that can be combined in a modular fashion with other IP blocks and implemented in hardware.

When a transaction request is received from a requesting agent via home interface 202, an entry for the transaction is allocated in local tracker table 212. Each entry includes transaction information 214, such as the source, destination and status of a request, together with a transaction identifier (ID). In accordance with an embodiment of the present disclosure, an entry also includes a lock status field 216. Lock status field 216 may be a single bit that indicates whether the transaction corresponding to the entry is locked or unlocked. This is discussed in more detail below.

Gateway 106 may also include timeout logic 218 that determines when a response to a pending request has not been received within a designated time period. Timeout logic 218 utilizes one or more counters or timers 220. A link protocol may specify a range of selectable timeout values. For example, the CXL™ 3.0 specification allows timeout values that vary from 50 µs to 64 s. In accordance with a further aspect of the present disclosure, a mechanism is provided for determining the width of a counter that can accommodate all the timeout ranges and values. The mechanism may use user-configurable registers 222. As described below, these registers may be used, for example, to configure the width of the counters and/or timeout values.

When a transaction using a gateway fails, it is desirable that all the pending and active transactions associated with the root port, or an identified downstream port, should be completed gracefully. Transaction failure may be indicated by a transaction timeout, for example.

In one embodiment of the disclosure, a failure of a transaction, or link, triggers isolation of all traffic below a root port or other downstream port of a gateway. When isolation is triggered, all pending transaction requests are signaled as being complete by synthesizing completion responses and sending them to the requesters. The requesters can continue sending downstream requests since no message is sent to the requester to indicate that the root port of the gateway has entered isolation.

In the event of a failure, the gateway acts to isolate the error to avoid the potential spread of data corruption. For example, the gateway may retire the tracker entries that have timed out, handle the slow responses of timed out requests and continue to service incoming requests without causing any system level hangs.

Error isolation may be triggered by transaction timeout or surprise link shutdown, for example. The controller of the gateway detects the isolation and starts an isolation flow for the local tracker entries by completing the requests and continuing to accept new requests. However, if the local agent tracker entries were to start servicing the new incoming requests, the responses to these new requests could get corrupted if there are late responses coming back for the older requests. An embodiment of the present disclosure provides a mechanism for locking out a tracker entry until a late response of a timed-out request is received or software quiesces the system and brings the port out of isolation. The lock status of an entry may be indicated, for example, by the value in a lock status field 216 of the entry in the tracker table.

Figure 3:
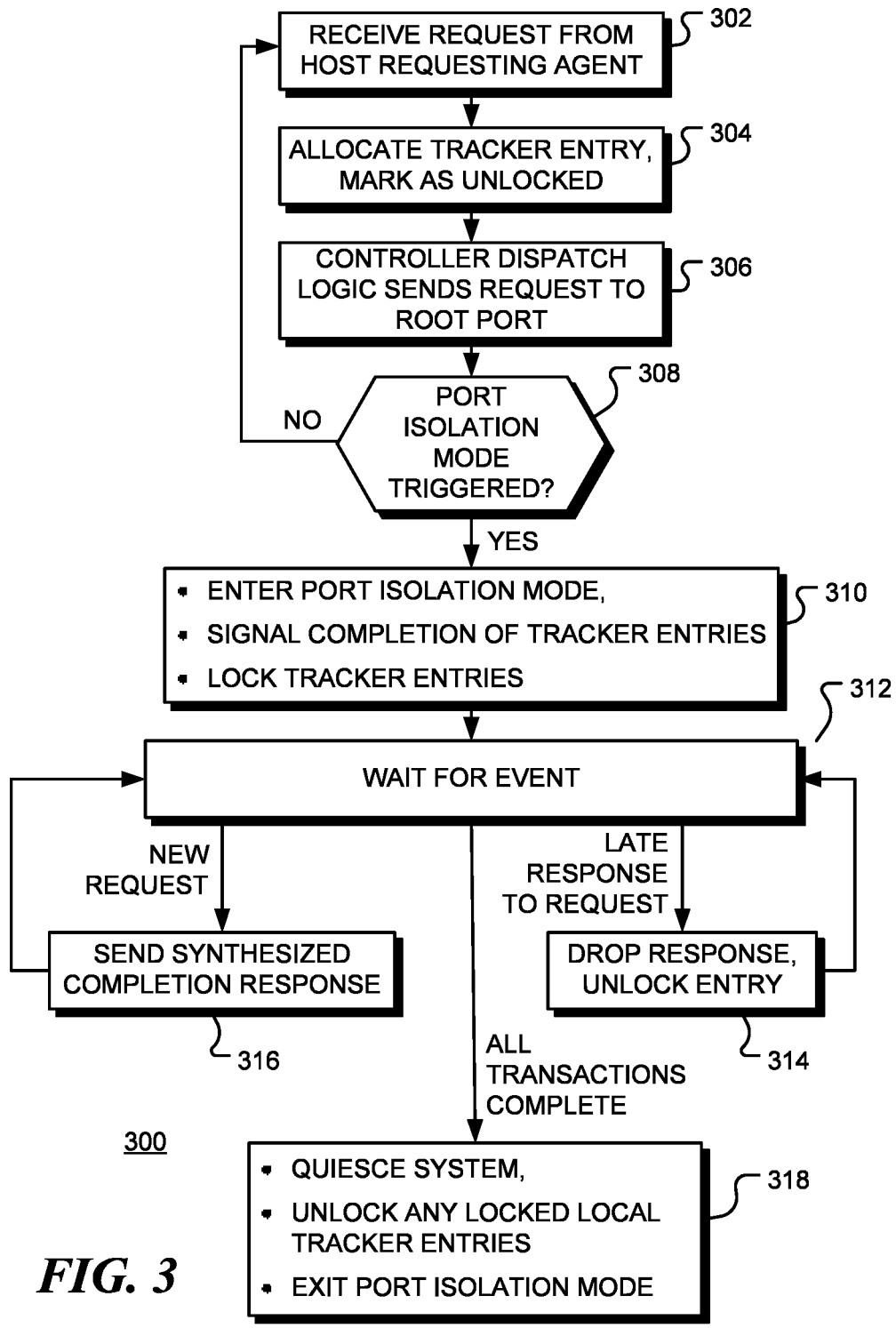
FIG. 3 is a flow chart of a method of error isolation in a gateway, in accordance with various representative embodiments.

FIG. 3 is a flow chart 300 of a method of error isolation in a gateway of a data processing system, in accordance with various representative embodiments. A transaction request is received from a host requesting agent at a gateway at block 302 and, if the local request tracker has a free entry, a tracker entry is allocated for the requested transaction at block 304. Dispatch logic circuitry of the gateway controller sends a corresponding request to the root port at block 306. If a port isolation mode has not been triggered, as depicted by the negative branch from decision block 308, flow returns to block 302. If a port isolation mode has been triggered, as depicted by the positive branch from decision block 308, port isolation mode is entered at block 310 by signaling completion of incomplete requests with entries in the local tracker table and moving these entries into isolation. A request is considered incomplete if the request has been dispatched and the gateway is waiting for a response. An entry may be moved into isolation by marking the entry as locked in the tracker table. Entries that are locked will not be allocated to any new request received by the gateway. Once in isolation mode, the gateway waits at block 312 for a new event to occur. When a late response is received for any of the locked requests, the response is dropped, and the entry is moved out of isolation by marking it as unlocked at block 314. This entry can now be allocated to a new request. When a new request is received from a host requesting agent, while the port is still in isolation mode, the new request will not be dispatched. Instead, a completion request is synthesized by the gateway controller and sent to the home requesting agent at block 316. When it is determined that all the outstanding transactions have been completed, the system is quiesced, any remaining locked entries are unlocked, and the port is moved out of isolation mode at block 318.

Figure 4:
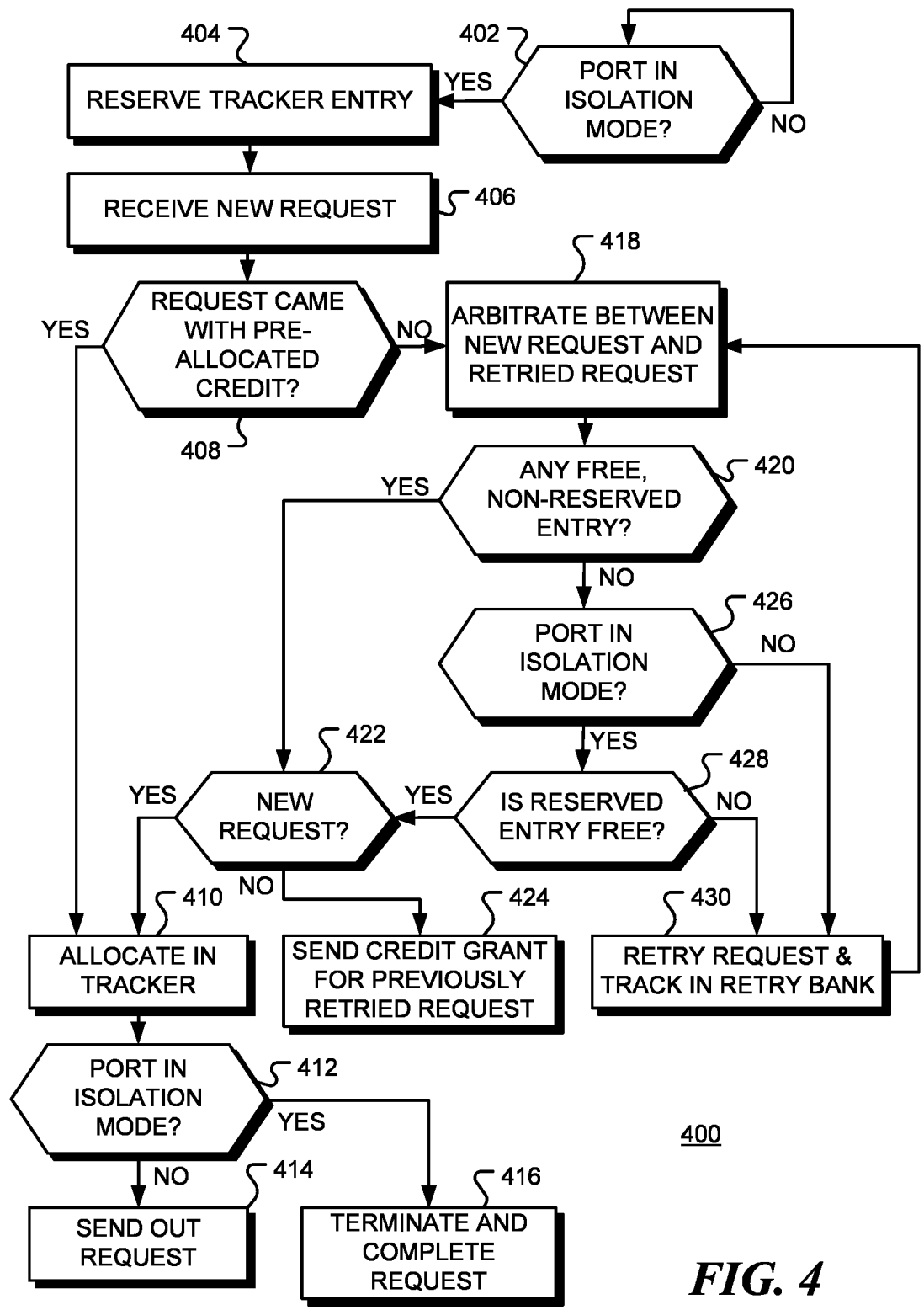
FIG. 4 is a flow chart of a method for servicing incoming requests, in accordance with various representative embodiments.

FIG. 4 is a flow chart of a method for servicing incoming requests at a chip-to-chip gateway, in accordance with various representative embodiments. In this embodiment, the gateway is configured to service incoming requests even though all the tracker entries have entered isolation or link requests have been sent out. When a port coupled to the gateway is in isolation, as depicted by the positive branch from decision block 402, an entry in the tracker of the gateway is reserved at block 404. At block 406, a new request is received at the gateway. If the new request came with a pre-allocated credit, as depicted by the positive branch from decision block 408, an entry in the tracker is allocated for the request at block 410. If the port is no longer in isolation, as depicted by the negative branch from decision block 412, the request is sent out at block 414. Otherwise, if the port is still in isolation, as depicted by the positive branch from decision block 412, the request is terminated and completed at block 416. When the new request did not come with a pre-allocated credit, as depicted by the negative branch from decision block 408, the gateway arbitrates between the new request and a retried request at block 418. If there is a free entry in the tracker, as depicted by the positive branch from decision block 420, and the arbitration selected the new request, as depicted by the positive branch from decision block 422, an entry is allocated in the tracker for the new request at block 410. If there is a free entry in the tracker, as depicted by the positive branch from decision block 420, and the arbitration selected the retried request, as depicted by the negative branch from decision block 422, a credit grant for the retried request is sent at block 424. If there is no free entry in the tracker, as depicted by the negative branch from decision block 420, flow continues to block 426. If the port is not in isolation mode or no reserved entry is free, as depicted by the negative branches from decision blocks 426 and 428, the selected request is retried and tracked in a retry bank at block 430.

If the port is in isolation mode and a reserved entry is free, as depicted by the positive branches from decision blocks 426 and 428, flow continues to decision block 422.

Thus, the one or more reserved entries in the tracker are used only when the following conditions have been met:
a. There are no free entries in the tracker;
b. All the entries within the tracker have timed out or have sent out a link request;
c. The port isolation is triggered; and
d. The request does not cause a link request to be sent out.

This mechanism enables the host to remain functional while the port is in isolation mode and makes efficient use of tracker resources.

Figure 5:
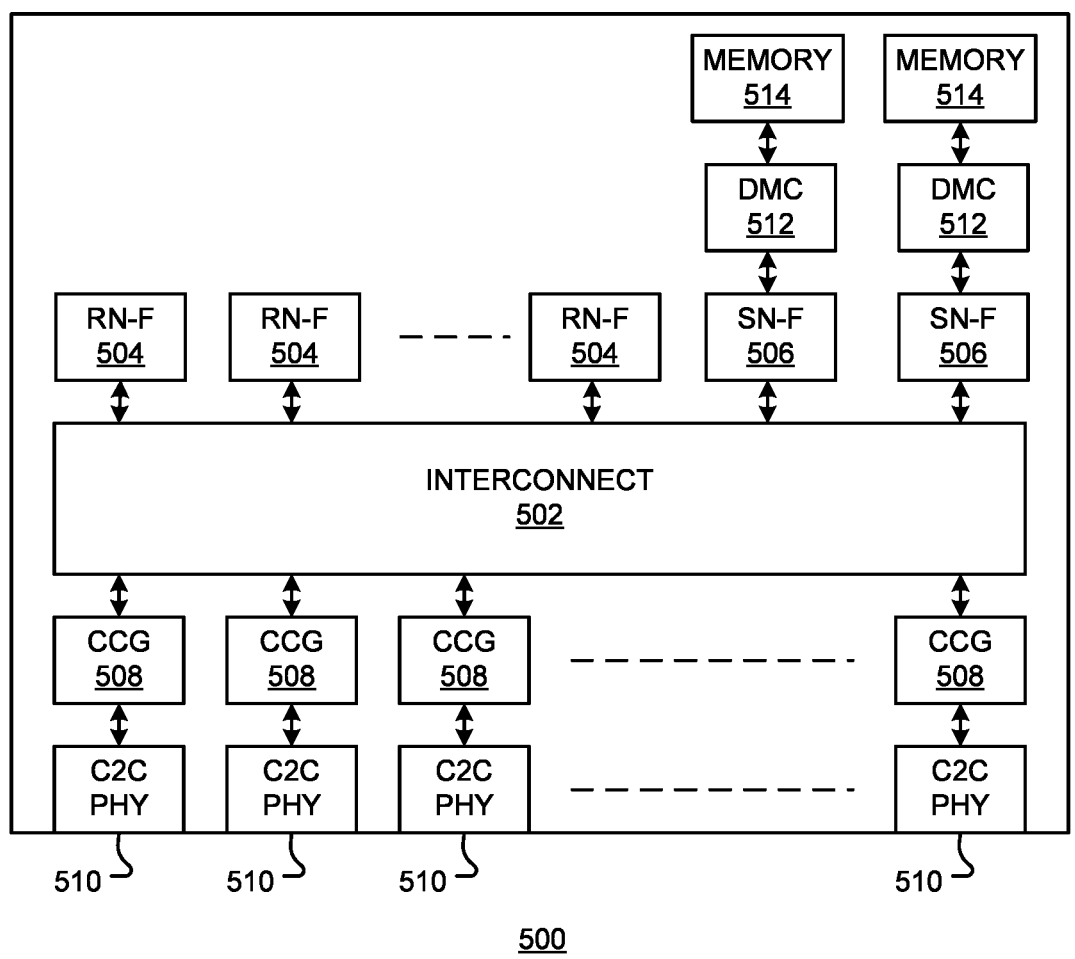
FIG. 5 is a simplified block diagram of a host chip, in accordance with various representative embodiments.

FIG. 5 is a simplified block diagram of a host chip 500, in accordance with various representative embodiments. In this embodiments, interconnect fabric 502 connects fully coherent request nodes 504 (such as CPUs) and slave nodes 506 to chip-to-chip gateways 508. Chip-to-chip gateways 508 are, in turn coupled to physical ports 510. Slave nodes 506 couple via dynamic memory controllers (DMCs) 512 to memories 514. Host chips may have other configurations.

Figure 6:
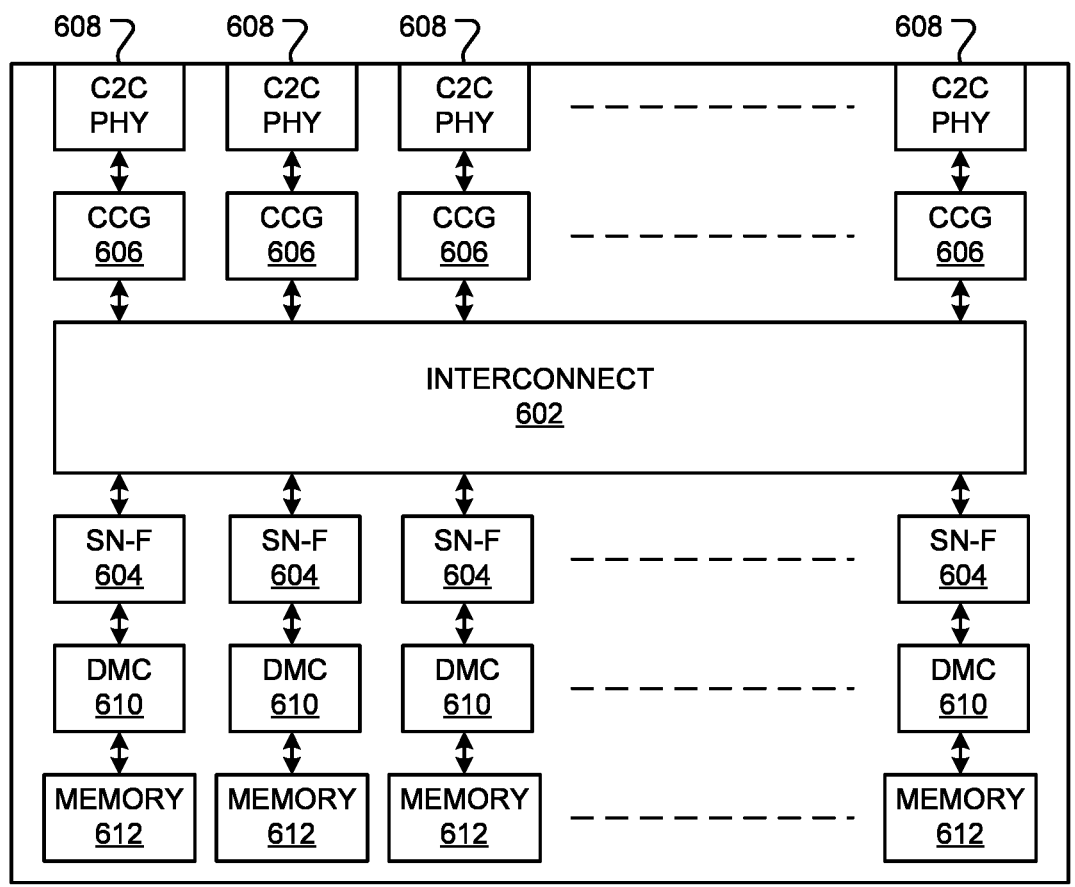
FIG. 6 is a simplified block diagram of a device chip, in accordance with various representative embodiments.

FIG. 6 is a simplified block diagram of a device chip 600, in accordance with various representative embodiments. In this embodiments, interconnect fabric 602 connects fully coherent slave nodes 604 to chip-to-chip gateways 606. Chip-to-chip gateways 606 are, in turn coupled to physical ports 608. Slave nodes 604 couple via dynamic memory controllers (DMCs) 610 to memories 612. Device chips may have other configurations.

As discussed above, port isolation mode can be triggered when a transaction times out. That is, no response has been received to a link request within a specified time interval. In some embodiments, the timeout interval may be varied dynamically during the runtime of an application executed on the host IC. For example, under the CXL™ 3.0 protocol, timeout values may range from 50 µs to 64 s. A timeout counter for these time values should be able to count the total number of cycles corresponding to 64 s. The clock frequency or clock period used by the gateway may be used to determine a counter value corresponding to a specified timeout interval. The clock may be a system or platform clock of the host, for example. The frequency could be indicated as a number of cycles in a specified time interval, such as a number of cycles in one second or a number of cycles in 25 µs. The counter itself needs to have sufficient width (number of bits) to be able to count up to, or down from, the timeout value. In general, however, the gateway has no knowledge of the platform clock frequency.

In accordance with an embodiment of the present disclosure, a "platform register" is provided. The platform register may be programmed by software to indicate the cycle count for a pre-determined time interval based on the clock frequency used by the gateway. This enables the gateway to calculate counter width and timeout counts for a given timeout interval based on the software programmed cycle value in the platform register. For a user-designated timeout range, a timeout value can be determined by left-shifting the value of the platform register by a predetermined value. The predetermined left-shift values may be stored in a lookup table indexed by timeout values or ranges. The gateway can automatically adjust to any changes to the timeout range selected by indexing into the look-up table and using the found left shift value—without the need for software intervention. This mechanism enables the gateway to determine the counter width without knowing the system frequency. Since the software can reprogram the timeout interval at any time during operation, the counter width is set to accommodate the longest allowable interval. For example, for a clock frequency of 4 GHz, the total number of cycles in 25 µs is 100,000 cycles. This value can be programmed into the platform register. The total number of cycles in an interval of 64 s can be computed from the platform register value as (64 s/25 µs)×100,000=256×10$^9$ cycles. This has hexadecimal value 0x3B9ACA0000, which occupies 38 bits. A 38-bit counter can count ~274×10$^9$ cycles and will accommodate all the timeout ranges. Thus, for the above selected frequency and timeout interval, the total number of cycles for the transaction to timeout is 256×10$^9$ cycles which may be counted using a 38-bit wide counter. Using this mechanism, both the counter width and the timeout value can be calculated for the given configuration.

A 38-bit counter can be used of all combinations of clock frequencies 4 GHz or less and timeout intervals 64 s or less. For example, for a platform frequency of 2 GHz, the total number of cycles for 25 µs at 2 GHz=50,000 cycles. For a timeout interval of 3.5 s, the total number of cycles is (3.5 s/25 µs)×50,000=7×10$^9$ cycles. Thus, the hexadecimal timeout value is 0x1A13B8600. This value occupies 33 bits and so can be counted using a 38-bit counter. The method can be applied to all the combinations of frequencies and selected time ranges to find the time values for the transaction timeouts.

In a first example, software programs the platform register with the number of cycles corresponding to 25 µs and the look-up table in TABLE 1 is populated. Entries in the look-up table indicate the number of left shifts to be used in calculating the time value in the specified range.

TABLE 1

| Selected Time Range | Left Shift Value |
|---|---|
| 50 µs to 10 ms | 8 |
| 50 µs to 100 µs | 1 |
| 1 ms to 10 ms | 8 |
| 16 ms to 55 ms | 11 |
| 65 ms to 210 ms | 13 |
| 260 ms to 900 ms | 15 |
| 1 s to 3.5 s | 17 |
| 4 s to 13 s | 18 |
| 17 s to 64 s | 21 |

Figure 7:
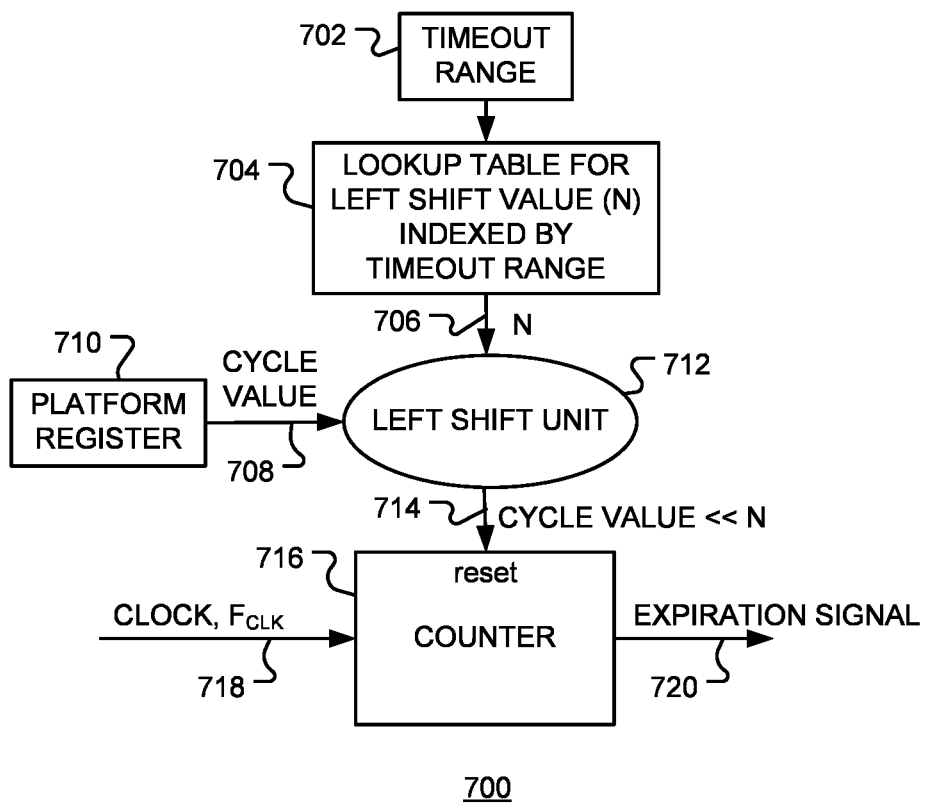
FIG. 7 is a block diagram of a timeout logic block, in accordance with various representative embodiments.

FIG. 7 is a block diagram of a timer logic block 700, in accordance with various representative embodiments. Referring to FIG. 7, timeout range register 702 is programmed with the selected timeout range by software. This range is used to access look-up table 704 and retrieved left-shift value N (706). The number of cycles 708 (CYCLE_VALUE) from the platform register 710 is shifted by the value selected from the look-up table in left-shift unit 712. The output 714 of left shift unit 712 is the computed timeout value CYCLE_VALUE<<N. Output 714 is supplied to counter 716. The look-up table access and left shift operation is performed in one cycle without any storing of left shift value. The output 714 supplied to counter 716 may be used as a reset value for a count-down timer, or a threshold value for count-up timer. Counter 716 is clocked by system clock signal 718 and generates an expiration signal at output 720 when timeout occurs.

It is noted that a port enters isolation mode only after the number of requests that have timed out exceeds a threshold value. The threshold value may be set in a programmable register, for example.

The isolation mechanisms described above enable requests that target operational devices or memory controllers to be serviced, without disabling the entire port.

The isolation mechanisms may be implemented on the device side or the host side of a communication link. For example, a device port couple to multiple memory controllers, each with different characteristics. When one of the memory controllers becomes unresponsive, the port can be isolated after the number of timed-out entries exceeds a designated threshold.

It is also noted that the isolation mechanism provides a high degree of granularity, enabling target memory addresses to be tracked and isolated a cache line granularity. A cache line may be 64 bytes, for example.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The embodiments described herein are combinable.

In one embodiment, a method comprising receiving a transaction request at a gateway of a link between a host processor and a device, allocating an entry for the transaction request in a local request tracker of the gateway, sending, by dispatch logic of the gateway, a link request, to a port of the gateway, where the link request is based on the transaction request, in response to an isolation trigger, entering an error isolation mode by moving the port into isolation, completing in-process transaction requests with entries in the local request tracker for which a link request has been dispatched and no response yet received, and marking the local request tracker entries as locked and disabling allocation of the entries, and on receiving a response to an in-process transaction request while in the error isolation mode, dropping the response, marking the associated entry as unlocked and enabling allocation of the entry, and completing a new transaction request for the entry at the gateway by sending completion response without dispatching a new link request to the port.

In one embodiment, the method further comprising, when transaction requests are completed, quiescing the system, marking locked entries as unlocked, and exiting the error isolation mode by moving the port out of isolation.

In another embodiment, the method where the port is a device port operatively coupled to one or more memory controllers.

In one embodiment, the method further comprising generating the isolation trigger when one of the one or more memory controllers becomes unresponsive.

In one embodiment, the method where the port is a host port operatively coupled to one or more processors.

In one embodiment, the method further comprising generating the isolation trigger after a designated number of transactions have timed-out.

In another embodiment, the method further comprising reading a value from a programmable platform register, the value indicating a number of clock cycles in a designated time interval, and configuring a timeout counter based on the value.

In one embodiment, the method where configuring the timeout counter includes accessing a look-up table, based on a designated timeout range, to retrieve a left-shift value, left-shifting the value read from the platform register by the left-shift value to provide a timeout value, and setting an initial or final value of the timeout counter to the timeout value.

In one embodiment, the method where the isolation trigger is associated with a specified target address and where entering the error isolation mode includes moving the port into isolation for the specified target address.

In another embodiment, the method further comprising reserving an entry in the local request tracker for new incoming requests, where the entry is used when the gateway is in isolation mode, no link request will be sent out for the new incoming request, there are no free entries in the local request tracker, and the entries within the local request tracker have timed out or have sent out a link request.

In one embodiment, an apparatus comprising a local request tracker configured to store entries for transaction requests received from a local requesting agent of a first chip, a port configured to send link requests to, and receive responses from, a remote agent of a second chip via a link between the first chip and the second chip, dispatch logic circuitry, configured to send link requests, based on the transaction requests, to the port, and a controller configured to, in response to an isolation trigger, enter an error isolation mode by moving the port into isolation, complete in-process transaction requests with entries in the local request tracker for which a link request has been dispatched and no response yet received, and mark the local request tracker entries as locked and disable allocation of the entries, and on receiving a response to an in-process transaction request while in the error isolation mode, drop the response, mark the associated entry as unlocked and enable allocation of the entry, and complete a new transaction request for the entry by sending a completion response without dispatching the new link request to the port.

In one embodiment, the apparatus where the controller is further configured to, when transaction requests are completed, quiesce the system, mark locked entries as unlocked, and exit the error isolation mode by moving the port out of isolation.

In another embodiment, the apparatus where the port is one or more of a root port, a downstream port of a hierarchy of ports, a device port, and an upstream port of the hierarchy of ports.

In one embodiment, the apparatus where the isolation trigger is a link failure.

In one embodiment, the apparatus further comprising a timeout counter, where the isolation trigger occurs when designated number of transaction timeouts indicated by the timeout counter.

In another embodiment, the apparatus further comprising a programmable platform register, where the controller is further configured to read a value from the programmable platform register, the value indicating a number of clock cycles in a designated time interval, and configure the timeout counter based on the value.

In one embodiment, the apparatus where the timeout counter is configured by setting an initial or final value of the timeout counter to a timeout value.

In one embodiment, the apparatus further comprising a look-up table of left-shift values indexed by timeout ranges, and a left-shift unit configured to left-shift the value of the software programmable platform register by a left-shift value retrieved from the look-up table, to provide the timeout value.

In another embodiment, the apparatus where the controller is further configured to reserve an entry in the local request tracker for new incoming requests, where the entry is used when the gateway is in isolation mode, no link request will be sent out for the new incoming request, there are no free entries in the local request tracker, and the entries within the local request tracker have timed out or have sent out a link request.

In one embodiment, a non-transient, computer readable medium containing instructions of a hardware description language or register transfer language descriptive of the apparatus.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method comprising:
   receiving a transaction request at a gateway of a link between a host processor and a device;
   allocating an entry for the transaction request in a local request tracker of the gateway;
   sending, by dispatch logic of the gateway, a link request, to a port of the gateway, where the link request is based on the transaction request;
   in response to an isolation trigger:
      entering an error isolation mode by moving the port into isolation;
      completing in-process transaction requests with entries in the local request tracker for which a link request has been dispatched and no response yet received; and
      marking the local request tracker entries as locked and disabling allocation of the entries; and
   on receiving a response to an in-process transaction request while in the error isolation mode:
      dropping the response;
      marking the associated entry as unlocked and enabling allocation of the entry; and
      completing a new transaction request for the entry at the gateway by sending completion response without dispatching a new link request to the port.

2. The method of claim 1, further comprising:
   when transaction requests are completed:
      quiescing the system;

marking locked entries as unlocked; and
exiting the error isolation mode by moving the port out of isolation.

3. The method of claim 1, where the port is a device port operatively coupled to one or more memory controllers.

4. The method of claim 1, further comprising generating the isolation trigger when one of the one or more memory controllers becomes unresponsive.

5. The method of claim 1, where the port is a host port operatively coupled to one or more processors.

6. The method of claim 5, further comprising:
reading a value from a programmable platform register, the value indicating a number of clock cycles in a designated time interval; and
configuring a timeout counter based on the value.

7. The method of claim 1, further comprising generating the isolation trigger after a designated number of transactions have timed-out.

8. The method of claim 7, where configuring the timeout counter includes:
accessing a look-up table, based on a designated timeout range, to retrieve a left-shift value;
left-shifting the value read from the platform register by the left-shift value to provide a timeout value; and
setting an initial or final value of the timeout counter to the timeout value.

9. The method of claim 1, where the isolation trigger is associated with a specified target address and where entering the error isolation mode includes moving the port into isolation for the specified target address.

10. The method of claim 1, further comprising reserving an entry in the local request tracker for new incoming requests, where the entry is used when:
the gateway is in isolation mode,
no link request will be sent out for the new incoming request,
there are no free entries in the local request tracker, and
the entries within the local request tracker have timed out or have sent out a link request.

11. An apparatus comprising:
a local request tracker configured to store entries for transaction requests received from a local requesting agent of a first chip;
a port configured to send link requests to, and receive responses from, a remote agent of a second chip via a link between the first chip and the second chip;
dispatch logic circuitry, configured to send link requests, based on the transaction requests, to the port; and
a controller configured to:
in response to an isolation trigger:
enter an error isolation mode by moving the port into isolation;
complete in-process transaction requests with entries in the local request tracker for which a link request has been dispatched and no response yet received; and
mark the local request tracker entries as locked and disable allocation of the entries; and
on receiving a response to an in-process transaction request while in the error isolation mode:
drop the response;
mark the associated entry as unlocked and enable allocation of the entry; and
complete a new transaction request for the entry by sending a completion response without dispatching the new link request to the port.

12. The apparatus of claim 11, where the controller is further configured to:
when transaction requests are completed:
quiesce the system;
mark locked entries as unlocked; and
exit the error isolation mode by moving the port out of isolation.

13. The apparatus of claim 11, where the port is one or more of a root port, a downstream port of a hierarchy of ports, a device port, and an upstream port of the hierarchy of ports.

14. The apparatus of claim 11, where the isolation trigger is a link failure.

15. The apparatus of claim 11, further comprising a timeout counter, where the isolation trigger occurs when designated number of transaction timeouts indicated by the timeout counter.

16. The apparatus of claim 15, further comprising a programmable platform register, where the controller is further configured to:
read a value from the programmable platform register, the value indicating a number of clock cycles in a designated time interval; and
configure the timeout counter based on the value.

17. The apparatus of claim 16, where the timeout counter is configured by setting an initial or final value of the timeout counter to a timeout value.

18. The apparatus of claim 16, further comprising:
a look-up table of left-shift values indexed by timeout ranges; and
a left-shift unit configured to left-shift the value of the software programmable platform register by a left-shift value retrieved from the look-up table, to provide the timeout value.

19. The apparatus of claim 11, where the controller is further configured to reserve an entry in the local request tracker for new incoming requests, where the entry is used when:
the gateway is in isolation mode,
no link request will be sent out for the new incoming request,
there are no free entries in the local request tracker, and
the entries within the local request tracker have timed out or have sent out a link request.

20. A non-transient, computer readable medium containing instructions of a hardware description language or register transfer language descriptive of the apparatus of claim 11.

* * * * *